US011976221B2

(12) United States Patent
Olry et al.

(10) Patent No.: US 11,976,221 B2
(45) Date of Patent: *May 7, 2024

(54) UNIVERSAL THERMOPLASTIC ADHESIVES FOR MULTILAYER FILMS

(71) Applicant: Dow Global Technologies LLC, Midland, MI (US)

(72) Inventors: Camille Olry, Valleiry (FR); Karlheinz Hausmann, Auvernier (CH); I-Hwa Lee, Wilmington, DE (US)

(73) Assignee: Dow Global Technologies LLC, Midland, MI (US)

( * ) Notice: Subject to any disclaimer, the term of this patent is extended or adjusted under 35 U.S.C. 154(b) by 718 days.

This patent is subject to a terminal disclaimer.

(21) Appl. No.: 17/255,541

(22) PCT Filed: Jun. 26, 2019

(86) PCT No.: PCT/US2019/039182
§ 371 (c)(1),
(2) Date: Dec. 23, 2020

(87) PCT Pub. No.: WO2020/009854
PCT Pub. Date: Jan. 9, 2020

(65) Prior Publication Data
US 2021/0371712 A1    Dec. 2, 2021

(30) Foreign Application Priority Data
Jul. 2, 2018   (EP) .................................... 18305862

(51) Int. Cl.
| | | |
|---|---|---|
| C09J 123/06 | (2006.01) | |
| B32B 7/12 | (2006.01) | |
| B32B 27/08 | (2006.01) | |
| B32B 27/30 | (2006.01) | |
| B32B 27/32 | (2006.01) | |
| B32B 27/34 | (2006.01) | |
| B32B 27/36 | (2006.01) | |
| C09J 123/08 | (2006.01) | |
| C09J 133/06 | (2006.01) | |

(52) U.S. Cl.
CPC .............. *C09J 123/06* (2013.01); *B32B 7/12* (2013.01); *B32B 27/08* (2013.01); *B32B 27/306* (2013.01); *B32B 27/32* (2013.01); *B32B 27/34* (2013.01); *B32B 27/36* (2013.01); *C09J 123/0869* (2013.01); *C09J 133/062* (2013.01); *B32B 2250/05* (2013.01); *B32B 2250/24* (2013.01); *B32B 2307/31* (2013.01); *B32B 2307/7244* (2013.01); *B32B 2553/026* (2013.01); *C08L 2205/03* (2013.01); *C08L 2205/035* (2013.01)

(58) Field of Classification Search
CPC .. B32B 7/12; C08L 2205/035; C08L 2205/03; C09J 123/16; C09J 123/14; C09J 123/142; C09J 123/18; C09J 123/20; C09J 123/06; C09J 123/00869; C09J 123/0815
See application file for complete search history.

(56) References Cited

U.S. PATENT DOCUMENTS

| | | |
|---|---|---|
| 2,200,429 A | 5/1940 | Willcox Perrin et al. |
| 2,953,551 A | 9/1960 | White |
| 3,350,372 A | 10/1967 | Anspon et al. |
| 3,645,992 A | 2/1972 | Elston |
| 3,756,996 A | 9/1973 | Pugh et al. |
| 3,914,342 A | 10/1975 | Mitchell |
| 4,076,698 A | 2/1978 | Anderson et al. |
| 4,599,392 A | 7/1986 | McKinney et al. |
| 5,053,457 A | 10/1991 | Lee |
| 5,217,812 A | 6/1993 | Lee |
| 5,272,236 A | 12/1993 | Lai et al. |
| 5,278,272 A | 1/1994 | Lai et al. |
| 5,532,066 A | 7/1996 | Latiolais et al. |
| 5,582,923 A | 12/1996 | Kale et al. |
| 5,733,155 A | 3/1998 | Sagawa |
| 5,854,045 A | 12/1998 | Fang et al. |
| 6,166,142 A | 12/2000 | Zhang et al. |

(Continued)

FOREIGN PATENT DOCUMENTS

| | | |
|---|---|---|
| CN | 101765613 A | 6/2010 |
| CN | 105934490 A | 9/2016 |

(Continued)

OTHER PUBLICATIONS

Translation of Chinese Office Action dated Feb. 9, 2022, pertaining to Chinese Patent Application No. 201980048721.0, 5 pgs.
Translation of Chinese Office Action dated Aug. 23, 2022, pertaining to Chinese Patent Application No. 201980048721.0, 5 pgs.
Translation of Indian Office Action dated Jun. 24, 2022, pertaining to Indian Patent Application No. 202117000274, 4 pgs.
Japanese Office Action issued by the Japanese Patent Office for Japanese Patent Application No. 2020-571435 dated May 9, 2023—original language (4 total pages).

(Continued)

*Primary Examiner* — Christopher M Rodd
(74) *Attorney, Agent, or Firm* — Dinsmore & Shohl LLP (57) ABSTRACT

Embodiments of the present disclosure are directed to a thermoplastic adhesive composition comprising: at least one maleic anhydride-grafted ethylene-based polymer; at least one at least one ethylene/α-olefin/non-conjugated diene interpolymer having a molecular weight distribution (MWD) ≥2.5, wherein MWD=Mw/Mn, wherein Mw is weight averaged molecular weight and Mn is number averaged molecular weight, which are both determined by gel permeation chromatography; a very low density polyethylene (VLDPE) having a density in the range 0.885 to 0.915 grams/cm$^3$; and optionally at least one ethylene alkyl (meth) acrylate copolymer, wherein the alkyl group comprises one to four carbon atoms.

12 Claims, 2 Drawing Sheets

(56) References Cited

U.S. PATENT DOCUMENTS

| | | | |
|---|---|---|---|
| 6,210,765 B1 | 4/2001 | Tanaka et al. | |
| 6,221,928 B1 * | 4/2001 | Kozma | C08L 23/06 521/134 |
| 6,545,091 B1 | 4/2003 | Lee et al. | |
| 8,202,590 B2 | 6/2012 | Lee et al. | |
| 2005/0016399 A1 | 7/2005 | Lee et al. | |
| 2007/0071988 A1 * | 3/2007 | Botros | C09J 123/0815 525/240 |
| 2007/0172614 A1 | 7/2007 | Lee | |
| 2016/0040044 A1 * | 2/2016 | Lee et al. | C08F 2/26 |
| 2017/0058159 A1 * | 3/2017 | Lee | B32B 5/02 |

FOREIGN PATENT DOCUMENTS

| | | |
|---|---|---|
| CN | 106574156 A | 11/2018 |
| WO | 2007009214 A1 | 9/2007 |
| WO | 2009017588 A1 | 2/2009 |
| WO | 2013/096418 A1 | 6/2013 |
| WO | 2016022581 A1 | 2/2016 |
| WO | 2016100277 A1 | 6/2016 |
| WO | 2016123209 A1 | 8/2016 |
| WO | 2017206008 A1 | 12/2017 |
| WO | WO-2017210195 A1 * | 12/2017 ............ C08F 210/02 |

OTHER PUBLICATIONS

Randall, J.C., "A Review of High Resolution Liquid 13Carbon Nuclear Magnetic Resonance Characterizations of Ethylene-Based Polymers", Rev. Macromol. Chem. Phys., C29 (2 &3), 1989, p. 285-297.

Extended European Search Report pertaining to corresponding European Patent Application No. 18305862.7, dated Nov. 13, 2018.

Extended European Search Report pertaining to corresponding European Patent Application No. 18305864.3, dated Jan. 17, 2019.

International Search Report and Written Opinion pertaining to PCT/US2019/039182, dated Aug. 26, 2019.

Williams et al., "The Construction of a Polyethylene Calibration Curve for Gel Permeation Chromatography Using Polystyrene Fractions", J. Polym. Sci., Polym. Letters, 6, 621 (1968).

International Search Report and Written Opinion pertaining to PCT/US2019/039187, dated Aug. 14, 2019.

* cited by examiner

FIG. 1

FIG. 2

UNIVERSAL THERMOPLASTIC ADHESIVES FOR MULTILAYER FILMS

CROSS-REFERENCE TO RELATED APPLICATIONS

This application is a National Stage Entry under 35 U.S.C. § 371 of International Patent Application No. PCT/US2019/039182, filed Jun. 26, 2019, which claims priority to European Patent Application No. 18305862.7, filed on Jul. 2, 2018, the entire disclosures of which are hereby incorporated by reference.

TECHNICAL FIELD

Embodiments of the present disclosure generally relate to thermoplastic adhesive compositions and more specifically relate to thermoplastic adhesive compositions used as tie layers in multilayer films.

BACKGROUND

Packaging films are increasingly manufactured by coextrusion systems and processes. These systems, in turn, are constantly growing in sophistication. Therefore, it is advantageous to develop materials for multilayer films that can be manufactured by a variety of coextrusion systems, including blown film, cast film, injection molding, sheet/bottle, and others. Whereas some years ago it was common for extrusion machines to be capable of coextruding three- to five-layer structures, it is now routine for machines to coextrude nine or more layers, for example by using an equal number of extruders to feed these layers.

Multilayered films for food packaging such as, e.g., shrink films, sealable films, lidding films, wrapping films or the like, may be produced by a variety of coextrusion and bi-orientation processes, for example, the tenter frame process, the triple bubble process, or the double bubble process. The Triple Bubble® process, which is a process developed by Kuhne Anlagenbau GmbH, may produce a coextruded biaxially oriented highly functional multilayer film in a single operation without the need to prepare separately a biaxially oriented mechanical support layer and laminating it to a second multilayer film to obtain the final structure. This greatly simplifies the manufacturing process for such films. However, because triple bubble films often include so many different layers, it is a challenge to maintain adhesive strength between all the different layers, for example, between polyethylene and polyamide layers, or between polypropylene and polyamide layers, or between polyester and polypropylene layers, or between polyester and polyethylene layers at a reasonable adhesion level of at least 2 N/15 mm after biaxial orientation.

Consequently, conventional triple bubble films utilize multiple distinct coextrudable adhesive compositions (also called tie layers), wherein each composition is specifically tailored to the specific polymer layers that need to be adhered to each other. Accordingly, there is a continual need for universal tie layer formulations which could provide suitable adhesion across various polymer layers in a multilayer film.

SUMMARY

Embodiments of the present disclosure address the needs discussed by providing an adhesive composition (tie layer) that provides adhesion to both polar and non-polar substrates after biaxial orientation in coextrusion and bi-orientation processes, such as the tenter frame process, the double bubble process, or the triple bubble process. This eliminates or at least reduces the need for so many distinct tie layer formulations within a triple bubble film.

According to one embodiment, a thermoplastic adhesive composition is provided. The thermoplastic adhesive composition comprises: at least one maleic anhydride-grafted ethylene-based polymer; at least one ethylene/α-olefin/non-conjugated diene interpolymer having a molecular weight distribution (MWD)≥2.5, wherein MWD=Mw/Mn, wherein Mw is weight averaged molecular weight and Mn is number averaged molecular weight, which are both determined by gel permeation chromatography; and a very low density polyethylene (VLDPE) having a density in the range 0.885 to 0.915 grams/cm³.

In a further embodiment, the thermoplastic adhesive composition comprises at least one ethylene alkyl (meth)acrylate copolymer, wherein the alkyl group comprises one to four carbon atoms.

BRIEF DESCRIPTION OF THE DRAWINGS

The following detailed description of specific embodiments of the present disclosure can be best understood when read in conjunction with the drawings enclosed herewith.

DETAILED DESCRIPTION

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer," which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

"Polypropylene" or "propylene-based polymer" as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 to 0.935 g/cc.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or 5,854,045). The LLDPE resins can be made via gas-phase, solution-phase, or slurry polymerization or any combination thereof, using any type of reactor or reactor configuration known in the art.

As used herein, ethylene based polymer resins typically in the range of 0.928 to 0.940 g/cc, may sometimes be referred to as medium density polyethylene ("MDPE") or linear medium density polyethylene (LMDPE). Polyethylenes having a density greater than 0.940 g/cc are high density polyethylenes ("HDPE"), which are generally prepared with Ziegler-Natta catalysts, chrome catalysts or even single site catalysts such as metallocene catalysts.

Very low density polyethylene ("VLDPE") can be produced by a number of different processes yielding polymers with different properties. In general, however, they have a density less than 0.916 g/cc, such as 0.880 to 0.915 g/cc, or 0.900 to 0.915 g/cc.

"(Meth)acrylic acid" includes methacrylic acid and/or acrylic acid and "(meth)acrylate" includes methacrylate and/or acrylate. Alkyl (meth)acrylate refers to alkyl acrylate and/or alkyl methacrylate.

"Multilayer structure" or "multilayer film" means any structure having more than one layer. For example, the multilayer structure (for example, a film) may have two, three, four, five, or more layers. In some embodiments, the multilayer film may comprise 13 layers or even more.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range starting from 0, such component is an optional component (i.e., it may or may not be present). When present an optional component may be at least 0.1 weight % of the composition or copolymer.

When materials, methods, or machinery are described herein with the term "known to those of skill in the art", "conventional" or a synonymous word or phrase, the term signifies that materials, methods, and machinery that are conventional at the time of filing the present application are encompassed by this description.

Thermoplastic Adhesive Composition

Embodiments of the present disclosure are directed to thermoplastic coextrudable adhesive compositions comprising: at least one maleic anhydride-grafted ethylene-based polymer; at least one ethylene/α-olefin/non-conjugated diene interpolymer having a molecular weight distribution (MWD)≥2.50, wherein MWD=Mw/Mn; and a very low density polyethylene (VLDPE) having a density from 0.885 to 0.915 g/cc.

Maleic Anhydride-Grafted Ethylene-Based Polymer

The maleic anhydride-grafted ethylene-based polymer is an ethylene-based polymer with a maleic anhydride grafting monomer grafted thereto. Suitable ethylene-based polymers for the maleic anhydride-grafted ethylene-based polymer include, without limitation, polyethylene homopolymers and copolymers with α-olefins, copolymers of ethylene and vinyl acetate, and copolymers of ethylene and one or more alkyl (meth)acrylates. In specific embodiments, the maleic anhydride-grafted ethylene-based polymer may comprise one or more of a maleic anhydride grafted linear low density polyethylene (LLDPE), a maleic anhydride grafted polyethylene elastomer, or a combination thereof.

When the ethylene-based polymer is a polyethylene homopolymer or a copolymer of ethylene with one of more α-olefins, the ethylene-based polymer may be linear or substantially linear. Suitable α-olefin comonomers, which may be either aliphatic or aromatic, may include $C_3$-$C_{20}$ α-olefins, $C_3$-$C_{16}$ α-olefins, or $C_3$-$C_{10}$ α-olefins. In one or more embodiments, the α-olefin may be a $C_3$-$C_{10}$ aliphatic α-olefin selected from the group consisting of propylene, 1-butene, 1-hexene and 1-octene. In one embodiment, the α-olefin is propylene.

The term "substantially linear" as used herein refers to a polymer backbone that is substituted with from 0.01 long chain branches per 1000 carbons to 3 long chain branches per 1000 carbons. The long chain branches have the same comonomer distribution as the polymer backbone, and can have about the same length as the length of the polymer backbone. The length of a long chain branch is longer than the carbon length of a short chain branch, the short chain branch being formed from the incorporation of the α-olefin comonomer into the polymer backbone. In contrast, the term "linear" as used herein refers to a polymer backbone that lacks measurable or demonstrable long chain branches, i.e., it is substituted with fewer than 0.01 long chain branches per 1000 carbons. The extent of long chain branching can be determined by using carbon-13 nuclear magnetic resonance ($^{13}$C-NMR) spectroscopy and can be quantified using the method of Randall (Rev. Macromol. Chem. Phys., C29 (2 & 3), 1989, p. 285-297).

In one or more embodiments, the maleic anhydride-grafted ethylene-based polymer may have a melt index ($I_2$)

of 1 to 500 g/10 min, or from 1 to 20 g/10 min, or from 1 to 10 g/10 min, or from 1 to 5 g/10 min, or from 2 to 4 g/10 min as determined in accordance with ASTM method D1238 at 190° C. and 2.16 kg.

In further embodiments, the maleic anhydride-grafted ethylene-based polymer has a density less than 0.900 g/cc, or from 0.860 to about 0.900 g/cc, as measured according to ASTM Method No. D792-91. Other density ranges may be from about 0.870 to about 0.890 g/cc, or from 0.875 to about 0.885 g/cc. (1 cc=1 cm$^3$)

In one or more embodiments, the maleic anhydride-grafted ethylene-based polymer comprises up to 10 wt. %, up to 5 wt. %, or from 1 to 4 wt. %, based on the total weight of the maleic anhydride-grafted ethylene-based polymer, of the maleic anhydride grafting monomer. The weight percentage of the ethylene-based polymer is complementary to the amount of maleic anhydride grafting monomer, so that the sum of the weight percentages of the ethylene-based polymer and the maleic anhydride grafted monomer is 100 wt. %. Thus, the maleic anhydride-grafted ethylene-based polymer comprises up to 90 wt. %, up to 95 wt. %, or from 96 to 99 wt. %, based on the total weight of the maleic anhydride-grafted ethylene-based polymer, of the ethylene-based polymer.

Various commercial embodiments are considered suitable. For example, suitable maleic anhydride-grafted ethylene-based polymers may be commercially available from DuPont under the trademark Fusabond® functional polymers.

Various amounts of the maleic anhydride-grafted ethylene-based polymer are contemplated as suitable within the thermoplastic adhesive composition. For example, the thermoplastic adhesive composition may comprise from 10 to 40 wt. %, from 15 to 35 wt. %, from 15 to 25 wt. %, or from 25 to 35 wt. % of maleic anhydride-grafted ethylene-based polymer.

Ethylene/α-Olefin/Non-Conjugated Diene Interpolymer

The ethylene/α-olefin/non-conjugated diene interpolymer may comprise one or more interpolymers, where each ethylene/α-olefin/non-conjugated diene interpolymer comprises in polymerized form, ethylene, an α-olefin, and a non-conjugated diene. In specific embodiments, the ethylene/α-olefin/non-conjugated diene interpolymer is a terpolymer.

Suitable α-olefin examples, which may be either aliphatic or aromatic, may include $C_3$-$C_{20}$ α-olefins, $C_3$-$C_{16}$ α-olefins, or $C_3$-$C_{10}$ α-olefins. In one or more embodiments, the α-olefin may be a $C_3$-$C_{10}$ aliphatic α-olefin selected from the group consisting of propylene, 1-butene, 1-hexene and 1-octene. In one embodiment, the α-olefin is propylene.

Suitable examples of non-conjugated dienes include $C_4$-$C_{40}$ non-conjugated dienes. Illustrative non-conjugated dienes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclo-do-decadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In specific embodiments, the non-conjugated diene is selected from the group consisting of ENB, dicyclopentadiene, 1,4-hexadiene, 7-methyl-1,6-octadiene, preferably ENB, dicyclopentadiene and 1,4-hexadiene, more preferably ENB and dicyclopentadiene, and even more preferably ENB.

In further embodiments, the ethylene/α-olefin/non-conjugated diene interpolymer is ethylene-propylene-diene terpolymer (EPDM), specifically a terpolymer product of ethylene, propylene and ENB.

Various amounts of each monomer are contemplated in the ethylene/α-olefin/non-conjugated diene interpolymer; however, the interpolymer comprises a majority amount of polymerized ethylene. In one or more embodiments, the ethylene/α-olefin/non-conjugated diene interpolymer comprises, based on the overall weight of the ethylene/α-olefin/non-conjugated diene interpolymer, from 50 to 80 wt. % ethylene, from 55 to 75 wt. % ethylene, or from 60 to 70 wt. % ethylene. Similarly, the ethylene/α-olefin/non-conjugated diene interpolymer comprises, based on the overall weight of ethylene/α-olefin/non-conjugated diene interpolymer, from 15 to 45 wt. % propylene, from 20 to 40 wt. % propylene, or from 25 to 35 wt. % propylene. Further, the ethylene/α-olefin/non-conjugated diene interpolymer comprises, based on the overall weight of ethylene/α-olefin/non-conjugated diene interpolymer, from 0.1 to 10 wt. % non-conjugated diene, from 0.1 to 5 wt. % non-conjugated diene, or from 0.1 to 1 wt. % non-conjugated diene.

In one or embodiments, the ethylene/α-olefin/non-conjugated diene interpolymer has a crystallinity from 7 to 20% as measured by Differential Scanning calorimetry. In further embodiments, the crystallinity is from 8 to 18, from 10 to 15, or from 12 to 15.

Additionally, the ethylene/α-olefin/non-conjugated diene interpolymer may be characterized by a Mooney Viscosity ($ML_{1+4}$) of 5 to 50, or 10 to 40, or 15 to 30, wherein Mooney Viscosity ($ML_{1+4}$) is measured according to ASTM D1646.

The ethylene/α-olefin/non-conjugated diene interpolymer may have a weight average molecular weight (Mw) as measured according to conventional gel permeation chromatography (GPC) of at least 90,000 g/mole, at least 100,000 g/mole, at least 110,000 g/mole, at least 120,000 g/mole, at least 200,000 g/mole, at least 220,000 g/mole, or at least 240,000 g/mole, or at least 260,000 g/mole, or at least 280,000 g/mole. Moreover, the ethylene/α-olefin/non-conjugated diene interpolymer may have a weight average molecular weight (Mw) less than, or equal to, 500,000 g/mole, or less than, or equal to, 450,000 g/mole, or less than, or equal to, 400,000 g/mole, or less than, or equal to, 250,000 g/mole, or less than, or equal to, 200,000 g/mole, or less than, or equal to, 150,000 g/mole.

Moreover, the ethylene/α-olefin/non-conjugated diene interpolymer may have a number average molecular weight (Mn) greater than, or equal to, 20,000 g/mole, or greater than, or equal to, 25,000 g/mole, or greater than, or equal to, 30,000 g/mole. In one or more embodiments, the ethylene/α-olefin/non-conjugated diene interpolymer has a number average molecular weight (Mn) less than, or equal to, 60,000 g/mole, or less than, or equal to, 55,000 g/mole, or less than, or equal to, 50,000 g/mole, or less than, or equal to, 40,000 g/mole.

As stated above, the ethylene/α-olefin/non-conjugated diene interpolymer may have a molecular weight distribution (MWD) of at least 2.5, wherein MWD=Mw/Mn. Moreover, the ethylene/α-olefin/non-conjugated diene interpolymer may have an MWD less than, or equal to, 10.00, further less than, or equal to, 9.50, further less than, or equal to, 9.00, or further less than or equal to 5. In one embodiment, or in combination with any one or more embodiments described herein, the ethylene/α-olefin/non-conjugated diene interpolymer may have an MWD greater than, or equal to, 3.00, or greater than, or equal to, 3.25, or greater than, or equal to, 3.50.

Various commercial embodiments are considered suitable. For example, suitable ethylene/α-olefin/non-conjugated diene interpolymers may include NORDEL™ IP 3720P which is produced by The Dow Chemical Company, Midland, MI.

Various amounts of the ethylene/α-olefin/non-conjugated diene interpolymer are contemplated as suitable within the thermoplastic adhesive composition. For example, the thermoplastic adhesive composition may comprise from 10 to 40 wt. %, from 15 to 35 wt. %, or from 20 to 30 wt. % of ethylene/α-olefin/non-conjugated diene interpolymer.

VLDPE

Moreover, the VLDPE of the thermoplastic adhesive compositions may comprise a polyethylene homopolymer or a copolymer of ethylene with one of more α-olefins. Suitable α-olefin comonomers, which may be either aliphatic or aromatic, may include $C_3$-$C_{20}$ α-olefins, $C_3$-$C_{16}$ α-olefins, or $C_3$-$C_{10}$ α-olefins. In one or more embodiments, the α-olefin may be a $C_3$-$C_{10}$ aliphatic α-olefins selected from the group consisting of propylene, 1-butene, 1-hexene and 1-octene. In one embodiment, the α-olefin is 1-butene.

In one or more embodiments, the VLDPE has a density of 0.885 to 0.915 g/cc, or from 0.890 to 0.910 g/cc, or 0.895 to 0.905 g/cc. Moreover, the low density ethylene-based polymer may have a melt index ($I_2$) from 0.5 to 20 g/10 mins, or from 1.0 to 10 g/10 mins, or from 2 to 8 g/10 mins, or from 3 to 6 g/10 mins, Various commercial embodiments are considered suitable. For example, suitable VLDPE polymers may include FLEXOMER™ DFDB-9042 NT which is produced by The Dow Chemical Company, Midland, MI.

Various amounts of the VLDPE are contemplated as suitable within the thermoplastic adhesive composition. For example, the thermoplastic adhesive composition may comprise from 15 to 60 wt. %, from 15 to 50 wt. %, from 20 to 50 wt. %, from 20 to 30 wt. %, or from 40 to 50 wt. %, of low density ethylene-based polymer.

Ethylene Alkyl (Meth)Acrylate Copolymer

Additional embodiments of the thermoplastic adhesive composition may include least one ethylene alkyl (meth)acrylate copolymer, wherein the alkyl group comprises one to four carbon atoms. In one embodiment, the at least one ethylene alkyl (meth)acrylate copolymer is an ethylene methyl acrylate copolymer.

Various amounts of ethylene and (meth)acrylate copolymer are contemplated for the ethylene alkyl (meth)acrylate copolymer. In one or more embodiments, the ethylene alkyl (meth)acrylate copolymer comprises, based on the overall weight of the ethylene alkyl (meth)acrylate copolymer, from 55 to 90 wt. % ethylene, or from 60 to 80 wt. % ethylene, or from 70 to 80 wt. % ethylene. Similarly, the ethylene alkyl (meth)acrylate copolymer comprises, based on the overall weight of the ethylene alkyl (meth)acrylate copolymer, from 10 to 45 wt. % alkyl (meth)acrylate, or from 15 to 35 wt. % alkyl (meth)acrylate, or from 20 to 30 wt. % alkyl (meth)acrylate.

In one or more embodiments, the ethylene alkyl (meth)acrylate copolymer may comprise a density of 0.920 to 0.960 g/cc, from 0.930 to 0.955 g/cc, from 0.935 to 0.950 g/cc, or from 0.940 to 0.950 g/cc. Moreover, the ethylene alkyl (meth)acrylate copolymer may have a melt index ($I_2$) from 0.5 to 50 g/10 min, from 1 to 10 g/10 min, from 1 to 5 g/10 min, or from 1 to 3 g/10 min.

Further, the ethylene alkyl (meth)acrylate copolymer may have a melting point of at least 80° C. as determined using differential scanning calorimetry (DSC) according to ASTM D3418. In further embodiments, the ethylene alkyl (meth)acrylate copolymer may have a melting point of at least 85° C., or at least 90° C. Moreover, the ethylene alkyl (meth)acrylate copolymer may have a melting point less than 105° C., from less than 100° C., or from less than 95° C. Without being bound by theory, the melting point of the ethylene alkyl (meth)acrylate copolymer may be beneficial from a processing standpoint, because it may make the thermoplastic adhesive composition easier to pelletize.

Suitable copolymers of ethylene and an alkyl (meth)acrylate may be synthesized in an autoclave by methods described in U.S. Pat. Nos. 2,200,429; 2,953,551; and 3,350,372, for example. In other cases, copolymers of ethylene and an alkyl (meth)acrylate are "tubular reactor-produced", that is, the copolymers are produced at high pressure and elevated temperature in a multi-zone or "tubular" reactor, or the like, in which the dissimilar reactivity ratios of the ethylene and alkyl acrylate comonomers are alleviated in whole or in part by the introduction of the monomers along the reaction flow path within the tubular reactor. As a consequence, the primary structure of the copolymer reflects a higher degree of randomness of comonomer distribution in the polymer chain. Thus, tubular reactor-produced ethylene copolymer can be physically distinguished from autoclave-produced ethylene copolymers. With respect to bulk properties, tubular reactor-produced ethylene alkyl (meth)acrylate copolymers are generally stiffer and more elastic than autoclave-produced copolymers. Tubular reactor-produced ethylene copolymers and methods of making the copolymers are described in U.S. Pat. Nos. 3,350,372; 3,756,996; and 5,532,066, for example. Suitable tubular reactor-produced ethylene alkyl (meth)acrylate copolymers are commercially available from DuPont under the trademark Elvaloy® AC acrylate copolymers.

Various amounts of the ethylene alkyl (meth)acrylate copolymers are contemplated as suitable within the thermoplastic adhesive composition. For example, the thermoplastic adhesive composition may comprise up to 40 wt. %, from 10 to 40 wt. %, from 20 to about 40 wt. %, or from 25 to 35 wt. %, based on the total weight of the ethylene alkyl (meth)acrylate copolymer.

Multilayer Films

The above-described thermoplastic adhesive compositions are particularly useful as a tie layer in multilayer structures, such as, for example, multilayer films, and in particular as a tie layer in co-extruded and subsequently biaxially oriented multilayer films. Suitable tie layers comprise the thermoplastic adhesive composition, or consist essentially of the thermoplastic adhesive composition, or consist of the thermoplastic adhesive composition. The thickness of each tie layer of the multilayer structure may be independently less than 1 μm, between 1 and 100 μm, between 5 and 50 μm, or between 5 and 30 μm.

The multilayer films may be formed and oriented (for example, biaxially oriented) by any suitable process. Information about these processes may be found in reference texts such as, for example, the *Kirk Othmer Encyclopedia*, the *Modern Plastics Encyclopedia* or the *Wiley Encyclopedia of Packaging Technology*, 2d edition, A. L. Brody and K. S. Marsh, Eds., Wiley-Interscience (Hoboken, 1997). For example, the multilayer films may be formed through dip-coating, film casting, sheet casting, solution casting, compression molding, injection molding, lamination, melt extrusion, blown film including circular blown film, extrusion coating, tandem extrusion coating, or any other suitable procedure. Preferably, the sheets are formed by a melt extrusion, melt coextrusion, melt extrusion coating, or tandem melt extrusion coating process. Suitable orientation processes include tenter frame technology and machine-direction orientation (MDO) technology.

In specific embodiments, the coextruded multilayer film structure is manufactured in a co-extrusion process with orientation by inflation, such as, for example, a "double bubble" process, or preferably the "triple bubble" processes described in Intl. Patent Appln. Publn. Nos. WO2007/099214 and WO2016/100277. As a brief summary, the triple bubble (3B) process for manufacturing a coextruded multilayer film structure comprises the steps of: coextruding a tubular multilayer film structure; cooling the coextruded tubular multilayer film structure in a first bubble, mono- or bi-axially orienting the coextruded tubular multilayer film structure under heating in a second bubble; and thermofixing the bi-axially oriented coextruded tubular multilayer film structure under heating in a third bubble.

The multilayer films described herein are useful as packaging and in particular as packaging for food. The multilayer films may be useful as shrinkable films, sealable films, lidding films, wrapping films, and the like. In addition, the multilayer films may be further processed to form shrink bags, pouches, balloons, artificial turf, and the like.

The present multilayer embodiments are directed to multilayer structures comprising at least one layer that includes the coextrudable thermoplastic adhesive composition. These layer(s) of the multilayer film may independently have a thickness of less than 1 µm, between 1 and 100 µm, between 1 and 5 µm, between 5 and 50 µm, or between 5 and 30 µm. In one embodiment, the multilayer film comprises a first layer comprising polyamide, a second layer comprising ethylene based polymer, and a tie layer comprising the above-described thermoplastic adhesive composition disposed between the first layer and the second layer. Additionally, as a separate multilayer film or within the same multilayer film, the tie layer comprising the above-described thermoplastic adhesive composition may be disposed between a polyester layer and a polyolefin layer.

The polyolefin may include ethylene-based polymer or propylene-based polymer. Suitable polyesters and copolymers thereof include, without limitation, polycarbonates; aliphatic polyesters, such as polyhydroxyalkanoic acids, including for example polylactic acid or poly(3-hydroxybutyrate); and semiaromatic polyesters such as polyethylene terephthalate (PET), for example, and copolymers thereof, such as PETG, polytrimethylene terephthalate, polybutylene terephthalate and polyethylene naphthalate. Polyethylene terephthalate (PET) is one example material for the polyester layer.

Without being limited to theory, the present tie layers were surprisingly found to be universal, which means the tie layers can be used at various locations for a triple bubble film rather than using different tie layer compositions everywhere. Specifically, the present tie layers can adhere disparate substrates, such as polyamide to ethylene-based polymer, at a requisite adhesion strength, while also adhering further disparate substrates, such as polyester to polyolefin, at a requisite adhesion strength. Consequently, in some embodiments, the present tie layers eliminate the need for multiple tie layers or at least reduce the number of tie layer formulations needed to adhere the various layers of the multilayer film. In specific embodiments, this present tie layers are beneficial to maintain adhesion after the multilayer film is biaxially oriented in processes such as the double bubble or the triple bubble process.

In one embodiment, the tie layer may have an adhesion strength of at least 2.5 N/15 mm at a temperature of 60° C. In a further embodiment, the tie layer may have an adhesion strength of at least 3.0 N/15 mm at a temperature of 60° C. This adhesion performance is highly desirable to prevent delamination in a shrink film.

Moving from the basic multilayer film framework described above, the following discussion provides details on layers conventionally used within multilayer films. These layers are also described in detail in PCT Intl. Patent Appln. Publn. No. WO2016/100277, by Hausmann et al.

External Layer

The outside surface layer, or external layer, of the food casing or food film provides the outside layer of a package and is the layer farthest from the packaged contents.

The outside layer may comprise polyester, polyamide (PA), polystyrene (PS), polycarbonate (PC), poly(methyl methacrylate) (PMMA), cyclic olefin copolymer (COC), polypropylene (PP), polyethylene (PE), including high density polyethylene (HDPE), or combinations thereof, providing the ability to weld or seal the films at high temperatures without the film being bonded to the sealing terminal. As a result, higher cycle numbers may be achieved on the sealing machines. In addition, these materials produce an external layer that is less susceptible to harm resulting from physical insults and that possesses excellent optical properties, such as gloss and transparency. Thus, the external layer provides mechanical support and protection of the other layers of the film. Furthermore, the external layer film is particularly well suited for inscribing or printing.

As stated above, the thermoplastic adhesive composition is particularly useful as a tie layer to adhere polyester layers to polyolefin layers. Accordingly, the external layer may comprise or consists essentially of one or more polyesters. Polyesters provide excellent optical properties, such as gloss and transparency, and permit a high speed of further processing (cycle numbers) as a result of their high temperature resistance.

The polyester is capable of being oriented under conditions that are typical of coextrusion processes with orientation, for example at temperatures in the range of 80 to 100° C. Preferably, the polyester layer is oriented in one or more directions. More preferably, the polyester layer is oriented in the machine direction (MD), in the transverse direction (TD), or in both the machine direction and the transverse direction. Still more preferably, the polyester layer is oriented biaxially in both the machine direction and the transverse direction.

Combinations of two or more layers having compositions such as described above may be used to provide the mechanical and/or protective functions of the external layer.

Polyolefin Layer

The thermoplastic adhesive composition is particularly useful as a tie layer to adhere polyester layers to polyolefin layers. Accordingly, the multilayer film preferably comprises a layer that comprises or consists essentially of one or more polyolefins. Polyolefin layers, sometimes referred to as "bulk layers" or "bulking layers", are useful to provide properties such as shrinkage, puncture resistance and stiffness in a multilayer film.

Suitable materials for polyolefin layers include, for example, propylene-based polymers, ethylene-based polymers, ionomers of copolymers of ethylene and (meth)acrylic acid, said ionomers optionally further comprising copolymerized alkyl (meth)acrylates. Preferred materials for polyolefin layers include, without limitation, copolymers of ethylene with vinyl acetate, alkyl(meth)acrylates, carboxylic acids and copolymers of ethylene acid copolymers and copolymers of polypropylene with other olefins, such as ethylene. Ionomers and copolymers of propylene and ethylene are more preferred materials for the polyolefin layer. Still more preferred are random or block copolymers of polypropylene, and random and block terpolymers of propylene with ethylene and another olefin, such as butene, for example. One preferred material is commercially available from Lyondell Basell of Rotterdam, Netherlands, under the tradename Adsyl. For example, Adsyl 5C30F resin is a suitable terpolymer of propylene, ethylene and butene.

Some preferred polyolefin layers are bulk shrinkable layers. Suitable polyolefins for use in bulk shrinkable layers are described in U.S. Pat. No. 8,202,590 and in Research Database Disclosure No. 448065, disclosed anonymously and published in Research Disclosure Journal (Kenneth Mason Publications, Ltd., Hants, U.K.; August, 2001). Ionomers of ethylene acid copolymers are preferred materials for the bulk shrinkable layer.

Gas Barrier Layer

The multilayer film optionally may also comprise a gas barrier layer. The term "gas barrier layer" as used herein denotes a film layer that allows transmission through the film of less than 1000 cc of gas, such as oxygen, per square meter of film per 24 hour period at 1 atmosphere and at a temperature of 23° C. at 50% relative humidity.

The barrier layer may provide for oxygen transmission below 500, below 100, below 50, below 30 or below 15 cc/m$^2$·day for the multilayer films. When factored for thickness the films preferably have oxygen permeation levels of less than 40 or less than 30 cc·mil/m$^2$·day. Other polymers may be present as additional components in the barrier layer, so long as they do not raise the permeability of the barrier layer above the limit defined above.

Suitable barrier layers may be chosen from layers comprising ethylene vinyl alcohol copolymer, cyclic olefin copolymers, polyvinyl acetate, or blends of one or more of these polymers with polyethylene, polyvinyl alcohol, or polyamide.

As stated previously, thermoplastic adhesive composition is particularly useful as a tie layer to adhere polyamide layers to polyolefin layers, such as layers including ethylene-based polymers. Various polyamides are suitable, for example, amorphous polyamides such as MXD6 and nylon 6I/6T (hexamethyleneiso-phthalamide hexamethylene terephthalamide copolymer)

Sealant Layer

The multilayer film may also comprise an inside surface layer, or sealant layer. This is the inside layer of a package that is closest to the packaged contents. It also provides a means for sealing or closing the package around the packaged product, such as by heat sealing two portions of the sealant layer together or to the surface of another part of the package, such as sealing a lidding film to a thermoformed packaging component. The composition of the sealant layer is selected to influence the sealing capability of the inside surface layer, for example, to achieve a high sealing bond strength at the lowest possible sealing temperature.

The sealant layer may comprise one or more polymers capable of fusion bonding on another layer by conventional means of heat sealing. The sealant layer may comprise one or more polyolefin polymers, such as for example polyethylene homopolymer or copolymer, ethylene alkyl (meth) acrylate copolymer, or an ethylene alkyl (meth)acrylic acid copolymer or ionomer thereof, or mixtures thereof. Preferably, the one or more olefin homopolymers and/or copolymers are chosen among ethylene-based polymer, and/or copolymers, ethylene copolymers such as for example ethylene (meth)acrylic acid copolymers and their corresponding ionomers, and/or mixtures thereof.

Moreover, the sealant may comprise a copolymer of ethylene with one of more α-olefins. Suitable α-olefin comonomers may include 1-butene, 1-hexane, or 1-octene. Various commercial embodiments are considered suitable, for example, the AFFINITY™ and ELITE™ polymers, which are both produced by The Dow Chemical Company, Midland, MI.

Other Adhesion Layer

Optionally in some embodiments, the coextruded multilayer structure may comprise one or more additional layers to serve as adhesion layers between functional layers to improve interlayer adhesion and prevent delamination of the layers. For example, such coextruded adhesion layers may be positioned between the external layer (PET) composition and the gas barrier layer composition, or between ionomer-containing layers and polyolefin layers. For example, adhesion compositions described in U.S. Pat. Nos. 6,545,091; 5,217,812; 5,053,457; 6,166,142; 6,210,765; and U.S. Patent Application Publication No. 2007/0172614 are suitable.

Example adhesive compositions are described in detail in PCT Intl. Patent Appin. Publn. No. WO2016/100277, cited above. Optional other adhesive compositions comprising olefin polymers and modified polymers are commercially available from DuPont under the trademarks Appeel® peelable sealant resins; Bynel® coextrudable adhesive resins; Elvaloy®AC ethylene acrylate copolymers; and Elvax® ethylene vinyl acetate copolymer resins.

Additives

The layer(s) comprising the thermoplastic adhesive composition and the additional layer(s) of the multilayer film structure may further comprise one or more modifiers or other additives, including without limitation plasticizers, impact modifiers, stabilizers including viscosity stabilizers and hydrolytic stabilizers, lubricants, antioxidants, UV light stabilizers, antifog agents, antistatic agents, dyes, pigments or other coloring agents, fillers, flame retardant agents, reinforcing agents, foaming and blowing agents, and processing aids known in the polymer compounding art, such as for example antiblock agents and release agents.

One or more of these additives may be present in each layer in amounts of up to 20 weight %, preferably from 0.01 to 7 weight %, and more preferably from 0.01 to 5 weight %, the weight percentage being based on the total weight of the layer's composition. Finally, these additives may be incorporated into the composition of each layer by methods that are known in the art. See, for example, the Kirk-Othmer Encyclopedia of Chemical Technology, 5th Edition, John Wiley and Sons (New York, 2004).

Example Multilayer Films

Representative examples of multilayer films include, without limitation, those in Table 1 below. In these descriptions, the symbol "I" represents a boundary between contiguous layers. In addition, outside to inside layers of the multilayer film, as intended to be used in a package, are listed in order from left to right. Moreover, "PET" represents polyethylene terephthalate, and "PA" represents a polyamide, for example as described in PCT Intl. Patent Appin. Publn. No. WO2016/100277, cited above. Two or more adhesive layers in a single film may have the same composition or different compositions, depending on the compositions of the layers adjacent to the adhesive layers. Accordingly, an adhesive layer is designated "Tie" when it comprises the thermoplastic adhesive composition described herein, and it is designated "T" when it comprises any other adhesive composition, for example those described above as suitable for optional other adhesive layers. When contiguous layers are ionomer layers, each layer has a different composition. With this exception, and with the further exception of PET layers, two or more contiguous layers may have the same composition, and these contiguous layers will form a single layer in the multilayer film. Finally, each multilayer film will have particular advantages depending on the intended packaging use or other application.

TABLE 1

| | |
|---|---|
| PET/Tie/PP/Tie/ionomer//Tie/PA/EVOH/PA/Tie/PE | PET/Tie/PE/ionomer/PA/EVOH/PA/Tie/PE |
| PET/Tie/EVA/ionomer//Tie/PA/EVOH/PA/Tie/PE | PET/Tie/EMA/ionomer/PA/EVOH/PA/Tie/PE |
| PET/Tie/PP/Tie/PA/EVOH/PA/Tie/PO/PE | PET/Tie/PE/Tie/PA/EVOH/PA/Tie/PO/PE |
| PET/Tie/ionomer//Tie/PA/EVOH/PA/Tie/PO/PE | PET/Tie/EVA/Tie/PA/EVOH/PA/Tie/PO/PE |
| PET/Tie/EMA/Tie/PA/EVOH/PA/Tie/PO/PE | PA/Tie/PP/Tie/ionomer/PA/EVOH/PA/Tie/PE |
| PA/Tie/PE/ionomer/Tie//PA/EVOH/PA/Tie/PE | PA/Tie/EVA/ionomer/PA/EVOH/PA/Tie/PE |
| PA/Tie/EMA/ionomer/Tie//PA/EVOH/PA/Tie/PE | PA/Tie/PP/Tie/PA/EVOH/PA/Tie/PO/PE |
| PA/Tie/PE/Tie/PA/EVOH/PA/Tie/PO/PE | PA/Tie/ionomer/Tie/PA/EVOH/PA/Tie/PO/PE |
| PA/Tie/EVA/Tie/PA/EVOH/PA/Tie/PO/PE | PA/Tie/EMA/Tie/PA/EVOH/PA/Tie/PO/PE |
| PET/Tie/PP/Tie/ionomer/Tie/PA/EVOH/PA/Tie/ionomer | PET/Tie/PE/ionomer/Tie/PA/EVOH/PA/Tie/ionomer |
| PET/Tie/EVA/ionomer/Tie/PA/EVOH/PA/Tie/ionomer | PET/Tie/EMA/ionomerT//PA/EVOH/PA/Tie/ionomer |
| PET/Tie/PE/Tie/PA/EVOH/PA/Tie/PO/ionomer | PET/Tie/PE/Tie/PA/EVOH/PA/Tie/PO/ionomer |
| PET/Tie/ionomer/PA/EVOH/PA/Tie/PO/ionomer | PET/Tie/EVA/Tie/PA/EVOH/PA/Tie/PO/ionomer |
| PET/Tie/EMA/Tie/PA/EVOH/PA/Tie/PO/ionomer | PA/Tie/PP/Tie/ionomer/Tie/PA/EVOH/PA/Tie/ionomer |
| PA/Tie/PE/ionomer/PA/EVOH/PA/Tie/ionomer | PA/Tie/EVA/ionomer//Tie/PA/EVOH/PA/Tie/ionomer |
| PA/Tie/EMA/ionomer/PA/EVOH/PA/Tie/ionomer | PA/Tie/PP/Tie/PA/EVOH/PA/Tie/PO/ionomer |
| PA/Tie/PE/Tie/PA/EVOH/PA/Tie/PO/ionomer | PA/Tie/ionomer/Tie/PA/EVOH/PA/Tie/PO/ionomer |
| PA/Tie/EVA/Tie/PA/EVOH/PA/Tie/PO/ionomer | PA/Tie/EMA/Tie/PA/EVOH/PA/Tie/PO/ionomer |

In preferred multilayer films, at least one layer is monoaxially or biaxially oriented. More preferably, at least one layer is oriented in the machine direction, in the transverse direction, or in both the machine direction and the transverse direction. In more preferred films, the oriented layer is a polyester layer or, in particular, a PET layer. Still more preferably, the polyester layer or the PET layer is biaxially oriented. Also preferably, the polyester layer or the PET layer is the external layer.

Some preferred multilayer films include a structure having three contiguous layers PET/Tie/PA, PET/Tie/PO, or PA/Tie/PO, and some preferred multilayer films consist of the three contiguous layers PET/Tie/PA, PET/Tie/PO, or PA/Tie/PO, wherein "Tie" is as defined above. In these preferred films, the polyolefin layer "PO" may be a bulk layer or a sealant layer.

Testing Methods

Melt Index ($I_2$)

Melt index ($I_2$) values were measured in accordance to ASTM D1238 at 190° C. and 2.16 kg.

Density

Density measurements were made in accordance with ASTM D792, Method B.

Gel Permeation Chromatography (Conventional GPC)

A GPC-IR high temperature chromatographic system from PolymerChar (Valencia, Spain), was equipped with a Precision Detectors (Amherst, MA), 2-angle laser light scattering detector Model 2040, an IR5 infra-red detector and a 4-capillary viscometer, both from PolymerChar. Data collection was performed using PolymerChar Instrument-Control software and data collection interface. The system was equipped with an on-line, solvent degas device and pumping system from Agilent Technologies (Santa Clara, CA).

Injection temperature was controlled at 150 degrees Celsius. The columns were three 10-micron "Mixed-B" columns from Polymer Laboratories (Shropshire, UK). The solvent was 1,2,4 trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was 200 microliters, and the flow rate was one milliliters/minute. The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, *J. Polym. Sci.*, Polym. Letters, 6, 621 (1968)):

$$M\text{polyethylene} = A \times (M\text{polystyrene})^B \quad \text{(Equation 1)}$$

where M is the molecular weight, A has a value of 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

(Equation 2)

$$Mn(conv\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i} / LogM_{PE_i})}$$

-continued $$Mw(conv\ gpc) = \frac{\sum_{i=RV_{integration\ start}}^{i=RV_{integration\ end}} (LogM_{PE_i}\ IR_{measurement\ channel_i})}{\sum_{i=RV_{integration\ start}}^{i=RV_{integration\ end}} (IR_{measurement\ channel_i})} \quad (\text{Equation 3})$$

$$Mz(conv\ gpc) = \frac{\sum_{i=RV_{integration\ start}}^{i=RV_{integration\ end}} (LogM_{PE_i}^2\ IR_{measurement\ channel_i})}{\sum_{i=RV_{integration\ start}}^{i=RV_{integration\ end}} (LogM_{PE_i}\ IR_{measurement\ channel_i})} \quad (\text{Equation 4})$$

In Equations 2-4, the RV is column retention volume (linearly-spaced), collected at "1 point per second," the IR is the baseline-subtracted IR detector signal, in Volts, from the IR5 measurement channel of the GPC instrument, and Log $M_{PE}$ is derived from the polyethylene-equivalent MW determined from Equation 1. Data calculations were performed using "GPC One software (version 2.013H)" from Polymer-Char.

Differential Scanning Calorimetry

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, "6 mm diameter" specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C., and held isothermal for 3 minutes, in order to remove its thermal history. Next, the sample is cooled to −40° C., at a 10° C./minute cooling rate, and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature (Tm), peak crystallization temperature (Tc), heat of fusion (Hf) (in Joules per gram), and the calculated % crystallinity for polyethylene samples using Equation 5:

% Crystallinity=((Hf)/(292 J/g))×100      (Equation 5).

The heat of fusion (Hf) and the peak melting temperature are reported from the second heat curve. Peak crystallization temperature is determined from the cooling curve.

EXAMPLES

The following examples illustrate features of the present disclosure but are not intended to limit the scope of the disclosure.

Table 2 includes a list of commercial polymer and additives used in the tie layer Comparative Example A and Inventive Examples 1 and 2, which are listed in Table 3 below.

TABLE 2

| | Density (g/cc) | Melt Index ($I_2$) (g/10 min) | Supplier |
|---|---|---|---|
| FLEXOMER ™ DFDB-9042 NT (VLDPE) | 0.899 | 5.2 | The Dow Chemical Company (Midland, MI) |
| Fusabond ® N525 (maleic anhydride modified ethylene copolymer) | 0.880 | 3.7 | E. I. du Pont de Nemours and Company, Inc. |
| Elvaloy ® 1224AC (ethylene methyl acrylate copolymer) | 0.944 | 2.0 | E. I. du Pont de Nemours and Company, Inc. |
| Bynel ® 2002 (acid modified ethylene acrylate resin) | 0.930 | 10.0 | E. I. du Pont de Nemours and Company, Inc. |
| Fusabond ® A MG-556D (maleic anhydride-grafted copolymer) | 0.957 | 1.8 | E. I. du Pont de Nemours and Company, Inc. |

Additionally, Inventive Examples 1 and 2 included NORDEL™ IP 3720P (EPDM), which includes an MWD of 3-4, a crystallinity of 14% when measured according to Differential Scanning calorimetry (DSC), and a Mooney Viscosity ($ML_{1+4}$) of 20 when measured according to ASTM D1646. NORDEL™ IP 3720P is available from The Dow Chemical Company (Midland, MI).

Table 3 lists a comparative tie layer formulation (Comparative Example A), and two Inventive tie layer formulations (Inventive Examples 1 and 2) that were utilized in the triple bubble film of Table 3 below. The main difference between Inventive Examples 1 and 2 is that Example 1 does not include ethylene alkyl (meth)acrylate copolymer.

TABLE 3

| | Comparative Tie Example (% wt.) | Inventive Tie Example 1 (% wt.) | Inventive Tie Example 2 (% wt.) |
|---|---|---|---|
| FLEXOMER ™ DFDB-9042 NT | | 44.9 | 24.9 |
| NORDEL ™ IP 3720P | | 25 | 25 |
| Fusabond ® N525 | | 30 | 20 |
| Elvaloy ® 1224AC | 80 | | 30 |
| Bynel ® 2002 | 10 | | |
| Fusabond ® A556 | 10 | | |
| Antioxidant (Irganox ® 1010) | | 0.1 | 0.1 |

These tie layer formulations of Table 3 were included in 13-layer triple bubble films produced by the triple bubble process. The layer compositions of the 13-layer triple bubble films are provided in Table 4 below. The properties of Comparative Tie Example A and Inventive Tie Examples 1 and 2 were measured by including these adhesive compositions as tie layers in Layer 11 or Layer 2 as shown below.

TABLE 4

| Example | Comp. Film A | Inv. Film 1 | Inv. Film 2 | Comp. Film B | Inv. Film 3 | Inv. Film 4 | Thickness (μm) | Extrusion Temp |
|---|---|---|---|---|---|---|---|---|
| Layer 1 | PET | PET | PET | PET | PET | PET | 5 | 275° C. |
| Layer 2 | Tie-1 | Tie-1 | Tie-1 | Comp. Tie Example | Inv. Tie Ex. 1 | Inv. Tie Ex. 2 | 2.5 | 220° C. |
| Layer 3 | PO-1 | PO-1 | PO-1 | PO-1 | PO-1 | PO-1 | 5 | 220° C. |
| Layer 4 | PO-1 | PO-1 | PO-1 | PO-1 | PO-1 | PO-1 | 5 | 220° C. |
| Layer 5 | PO-1 | PO-1 | PO-1 | PO-1 | PO-1 | PO-1 | 5 | 220° C. |
| Layer 6 | PO-1 | PO-1 | PO-1 | PO-1 | PO-1 | PO-1 | 5 | 220° C. |
| Layer 7 | Tie-2 | Tie-2 | Tie-2 | Tie-2 | Tie-2 | Tie-2 | 2.5 | 220° C. |
| Layer 8 | PA | PA | PA | PA | PA | PA | 2.5 | 250° C. |
| Layer 9 | EVOH | EVOH | EVOH | EVOH | EVOH | EVOH | 2.5 | 210° C. |
| Layer 10 | PA | PA | PA | PA | PA | PA | 2.5 | 250° C. |
| Layer 11 | Comp. Tie Example | Inv. Tie Ex. 1 | Inv. Tie Ex. 2 | Tie-2 | Tie-2 | Tie-2 | 2.5 | 220° C. |
| Layer 12 | PO-2 | PO-2 | PO-2 | PO-2 | PO-2 | PO-2 | 5 | 220° C. |
| Layer 13 | Sealant | Sealant | Sealant | Sealant | Sealant | Sealant | 5 | 220° C. |

Triple Bubble Film Materials

Provided below are the compositions used in the layers of the triple bubble films of Table 4 above.

PET is a polyethylene terephthalate available commercially as Cumastretch FX from Dufor (Zevenaar, Netherlands).

PA is a blend of: 90 weight % of nylon 6 with a melting point of 220° C. and a melt flow of 25 g/10 min at 275° C. with 5 kg load according to ASTM D1238, available commercially as Grivory F40 from EMS-Grivory (Sumter, SC, U.S.A.); and 10 weight % of Selar® PA 3426 amorphous nylon resin, available commercially from DuPont.

EVOH is an ethylene vinyl alcohol available commercially as Soarnol™ AT4403 obtained from Nippon Goshei.

PO-1 is a random polypropylene copolymer, with a density of 0.900 g/cm$^3$, a melt index (MI) of 5.5 g/10 min at 230° C. with 2.16 kg load, melt point of 128° C. and a Vicat softening point of 103° C. available commercially from LyondelBasell as Adsyl 6C30F.

PO-2 is the same polymer blend as the Sealant, below, without additives.

Tie-1 is a modified ethylene acrylate resin commercially available from DuPont under the trademark Bynel® 22E780 adhesive resin.

Tie-2 is an anhydride-modified linear low density polyethylene, available commercially from DuPont under the trademark Bynel® 41E687 adhesive resin.

Sealant is a 70 wt % of an ethylene-based 1-octene plastomer, produced in a solution polymerization process using a metallocene catalyst, and having a density of 0.902 g/cm$^3$, $I_2$ of 3 g/10 min, and melting point of 96° C., available commercially as Queo 0203 from Borealis (Vienna, Austria); and 30 wt % of a metallocene-catalyzed ethylene-hexene copolymer commercially available under the designation Exceed™ 1018 from ExxonMobil Chemicals (Houston, TX, U.S.A.); with some additives, for example, slip or antiblock additives.

Triple Bubble Process

The coextruded multilayer films of Table 4 were produced on a triple bubble (3B) manufacturing line available from Kuhne Anlagenbau GmbH of Sankt Augustin, Germany, using the materials, thicknesses and extrusion temperatures set forth in Table 3 above, and the procedures and line speeds described in Intl. Patent Appln. Publn. Nos. WO2007/099214 and WO2016/100277. Special conditions for the co-extrusion of multilayer films including the thermoplastic adhesive composition described herein include orienting the film by exposing the second bubble to a temperature of 90° C. and annealing film by exposing the third bubble to a temperature of 60° C. for shrinkable films and 100° C. for non-shrinkable films, respectively.

Layer 1 is the outside surface layer of the three tubular bubbles, layer 13 is the inside surface layer of the three tubular bubbles, and layers 2 through 12 are the interior layers of the multilayer film. When contiguously co-extruded layers of the multilayer film comprise the same material, for example, in layers 3-6, the contiguously co-extruded layers appear to be a single layer in the final film structure. The coextruded multilayer films comprised an external layer of polyester at layer 1 and a gas barrier triplet layer, PA/EVOH/PA, at layers 8, 9 and 10.

Adhesion Testing

The adhesion strength was measured according to the following method. After extrusion, the films of Table 4 were conditioned for at least 24 hours under ambient conditions, then cut into long strips in the machine direction having a width of 15 mm in the transverse direction.

For Comparative Film A and Inventive Films 1 and 2, at one 15-mm end of the strips, layers 1-10 were separated by hand from Layers 12-13. The ends of the separated portions of the two layers were affixed to a tensile testing machine, and the delamination was continued by mechanically peeling the two ends apart. Layer 1-10 and Layers 12-13 were at an angle of 180° to each other during the mechanical delamination, and the speed at which the two ends were separated was 100 mm/min. The force that was required to delaminate the films under these conditions was measured and is reported as the adhesion strength in units of Newtons/15 mm.

For Comparative Film B and Inventive Films 3 and 4, at one 15-mm end of the strips, Layer 1 (PET) was separated by hand from Layers 3-13. The ends of the separated portions of the two layers were affixed to a tensile testing machine, and the delamination was continued by mechanically peeling the two ends apart. Layer 1 (PET) and Layers 3-13 were at an angle of 180° to each other during the mechanical delamination, and the speed at which the two ends were separated was 100 mm/min.

Figure 1:
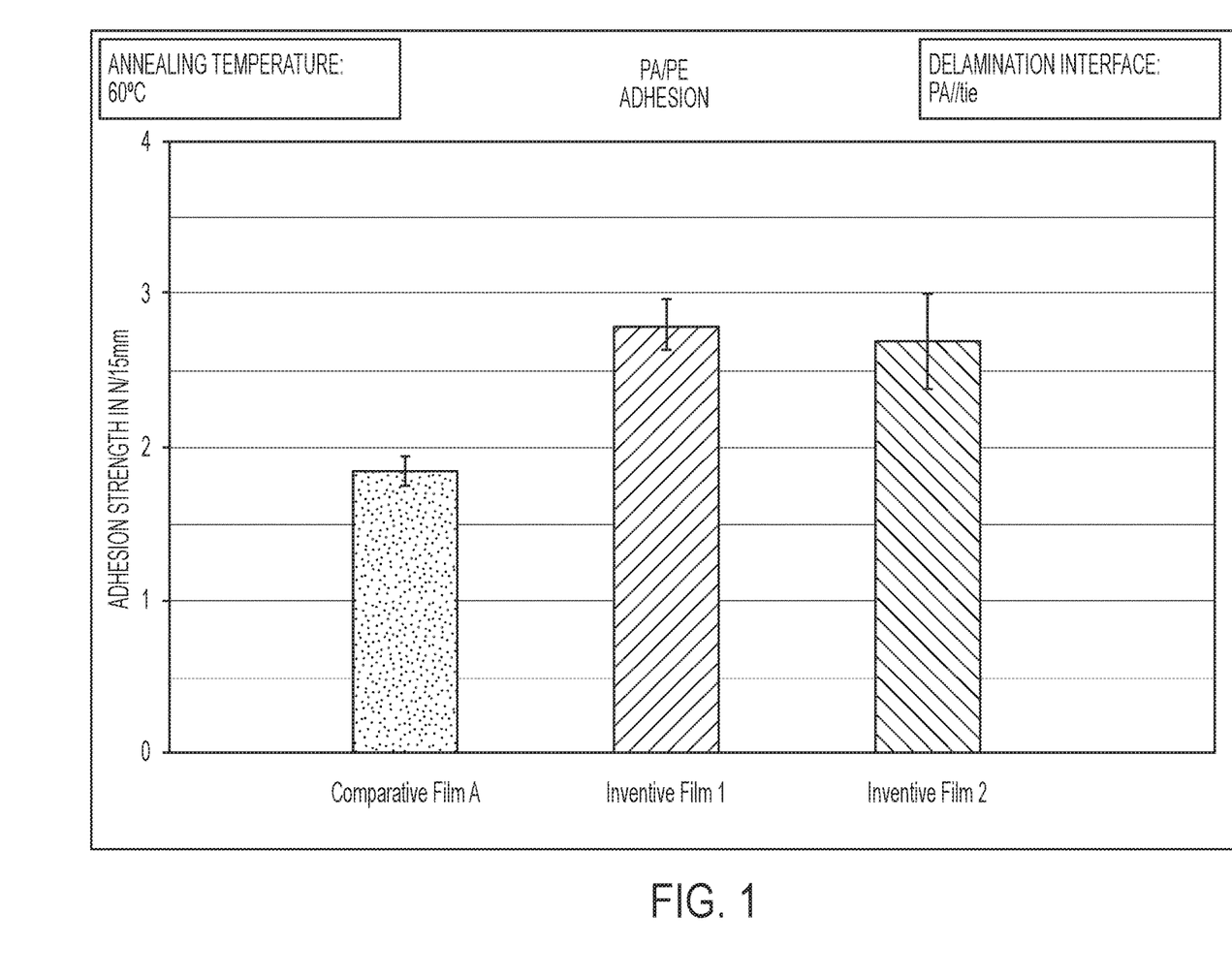
FIG. 1 is a bar chart depicting the adhesion strength performance of inventive tie layer formulations versus a comparative tie formulation, wherein each formulation adheres polyamide and polyethylene layers in a 13-layer triple bubble film.

FIG. 1 illustrates the adhesion strength of the Comparative Tie Example and Inventive Tie Examples 1 and 2 when used to adhere polyamide (PA) to polyethylene (PO-2). As shown, both Inventive Films 1 and 2, which included Inventive Tie Examples 1 and 2, respectively, provided an adhesion strength of greater than 2.5 N/15 mins, whereas Comparative Film A, which included the Comparative Tie Example, had undesirable adhesion strength of less than 2.0 N/15 mins.

Figure 2:
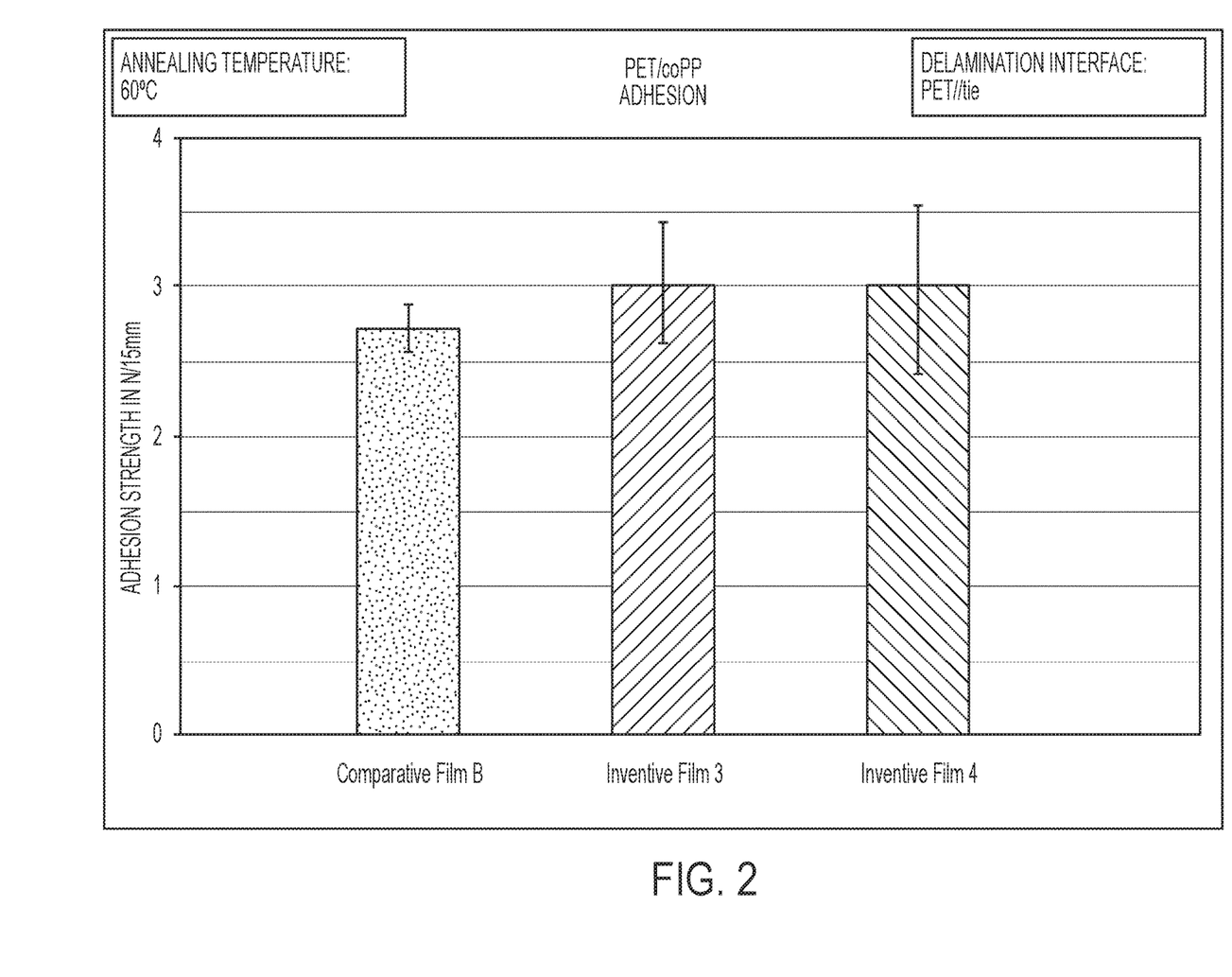
FIG. 2 is a bar chart depicting the adhesion strength performance of inventive tie layer formulations versus a comparative tie formulation, wherein each formulation adheres polyester and polypropylene copolymer layers in a 13-layer triple bubble film.

FIG. 2 illustrates the adhesion strength of the Comparative Tie Example and Inventive Tie Examples 1 and 2 when used to adhere polyester (PET) to polypropylene (PO-1). As shown, both Inventive Films 3 and 4, which included Inventive Tie Examples 1 and 2, respectively, provided an adhesion strength of about 3 N/15 mins, which were both higher than Comparative Film B, which included the Comparative Tie Example.

The adhesion performance of Inventive Films 3 and 4 is noteworthy, because polyesters are known to very poorly react with maleic anhydride; however, the combination of the maleic anhydride-grafted ethylene-based polymer (Fusabond® N525), with other components—ethylene/α-olefin/non-conjugated diene interpolymer (NORDEL™ IP 3720P EPDM), the VLDPE (FLEXOMER™ DFDB-9042), and optionally the ethylene alkyl (meth)acrylate copolymer (Elvaloy® 1224AC)—yielded improved adhesion across various polymer layers.

It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalents.

The invention claimed is:

1. A thermoplastic adhesive composition comprising:
   at least one maleic anhydride-grafted ethylene-based polymer;
   at least one ethylene/α-olefin/non-conjugated diene interpolymer having a molecular weight distribution (MWD) ≥2.5, wherein MWD=Mw/Mn, wherein Mw is weight averaged molecular weight and Mn is number averaged molecular weight, which are both determined by gel permeation chromatography;
   a very low density polyethylene (VLDPE) having a density in the range 0.885 to 0.915 grams/cm$^3$.

2. The thermoplastic adhesive composition of claim 1, further comprising at least one ethylene alkyl (meth)acrylate copolymer, wherein the alkyl group comprises one to four carbon atoms.

3. The thermoplastic adhesive composition of claim 2, wherein the ethylene alkyl (meth)acrylate copolymer comprises a density of 0.930 to 0.960 g/cc.

4. The thermoplastic adhesive composition of claim 2, wherein the thermoplastic adhesive composition comprises from 20 to 40% by weight of ethylene alkyl (meth)acrylate copolymer.

5. The thermoplastic adhesive composition of claim 1, wherein the maleic anhydride-grafted ethylene-based polymer comprises one or more of a maleic anhydride grafted linear low density polyethylene, a maleic anhydride grafted polyethylene elastomer, or a combination thereof.

6. The thermoplastic adhesive composition of claim 1, wherein the maleic anhydride-grafted ethylene-based polymer has a density below 0.900 g/cc and a melt index (I2) between 1 to 20 g/10 min.

7. The thermoplastic adhesive composition of claim 1, wherein the thermoplastic adhesive composition comprises from 10 to 40% by weight of maleic anhydride-grafted ethylene-based polymer.

8. The thermoplastic adhesive composition of claim 1, wherein the α-olefin of the ethylene/α-olefin/non-conjugated diene interpolymer is propylene and the non-conjugated diene of the ethylene/α-olefin/non-conjugated diene interpolymer is ethylidene-norbornene.

9. The thermoplastic adhesive composition of claim 1, wherein the thermoplastic adhesive composition comprises from 15 to 35% by weight of ethylene/α-olefin/non-conjugated diene interpolymer.

10. The thermoplastic adhesive composition of claim 1, wherein the VLDPE has a melt index (I2) from 2 to 8 g/10 mins.

11. The thermoplastic adhesive composition of claim 1, wherein the thermoplastic adhesive composition comprises from 15 to 50% by weight of the VLDPE.

12. The thermoplastic adhesive composition of claim 1, wherein the ethylene/α-olefin/non-conjugated diene interpolymer has a crystallinity from 7 to 20% as determined by Differential Scanning Calorimetry.

* * * * *

UNITED STATES PATENT AND TRADEMARK OFFICE
CERTIFICATE OF CORRECTION

| | |
|---|---|
| PATENT NO. | : 11,976,221 B2 |
| APPLICATION NO. | : 17/255541 |
| DATED | : May 7, 2024 |
| INVENTOR(S) | : Camille Olry, Karlheinz Hausmann and I-Hwa Lee |

Page 1 of 1

It is certified that error appears in the above-identified patent and that said Letters Patent is hereby corrected as shown below:

In the Claims

In Column 20, Line 16, Claim 6, delete "$(I2)$" and insert -- $(I_2)$ --, therefor.

In Column 20, Line 32, Claim 10, delete "$(I2)$" and insert -- $(I_2)$ --, therefor.

Signed and Sealed this
Sixth Day of May, 2025

Coke Morgan Stewart
*Acting Director of the United States Patent and Trademark Office*